US008343360B2

(12) United States Patent
Schook

(10) Patent No.: US 8,343,360 B2
(45) Date of Patent: Jan. 1, 2013

(54) DEVICE AND METHOD FOR SEPARATING A FLOWING MEDIUM MIXTURE WITH A STATIONARY CYCLONE

(75) Inventor: Robert Schook, Steenderen (NL)

(73) Assignee: Advanced Tail-End Oil Company N.V., Willemstad, Curacao (AN)

( * ) Notice: Subject to any disclaimer, the term of this patent is extended or adjusted under 35 U.S.C. 154(b) by 92 days.

(21) Appl. No.: 12/522,936

(22) PCT Filed: Jan. 8, 2008

(86) PCT No.: PCT/NL2008/050012

§ 371 (c)(1), (2), (4) Date: Nov. 9, 2009

(87) PCT Pub. No.: WO2008/085042

PCT Pub. Date: Jul. 17, 2008

(65) Prior Publication Data

US 2010/0140187 A1 Jun. 10, 2010

(30) Foreign Application Priority Data

Jan. 11, 2007 (NL) .................................... 2000429

(51) Int. Cl.
*B01D 17/038* (2006.01)
*B01D 21/26* (2006.01)
*B04C 5/103* (2006.01)

(52) U.S. Cl. ..................... 210/788; 210/512.1; 209/717; 209/718; 209/719; 209/734; 95/269; 55/416; 55/459.1; 55/459.3; 55/459.4; 55/459.5

(58) Field of Classification Search ............... 210/512.1, 210/788; 209/717, 718, 719, 734; 95/269; 55/459.1, 459.3, 459.4, 459.5, 416
See application file for complete search history.

(56) References Cited

U.S. PATENT DOCUMENTS

| | | | |
|---|---|---|---|
| 3,348,683 | A | 10/1967 | Wikdahl |
| 3,535,850 | A | 10/1970 | von Ohain et al. |
| 4,420,314 | A | 12/1983 | Barron, Jr. |
| 4,838,906 | A | 6/1989 | Kiselev |
| 5,227,061 | A | 7/1993 | Bedsole |
| 6,702,877 | B1 | 3/2004 | Swanborn |

FOREIGN PATENT DOCUMENTS

| | | | |
|---|---|---|---|
| FR | 2134520 | | 12/1972 |
| JP | 56081111 | | 7/1981 |
| RU | 2035237 | | 5/1995 |
| WO | 9705956 | A1 | 2/1997 |
| WO | 9728903 | A1 | 8/1997 |
| WO | 0218056 | A2 | 3/2002 |

OTHER PUBLICATIONS

Search Report and Written Opinion for International Patent Application No. PCT/NL2008/050012; Apr. 17, 2008.

*Primary Examiner* — David A Reifsnyder
(74) *Attorney, Agent, or Firm* — Jason A. Bernstein; Barnes & Thornburg LLP

(57) ABSTRACT

A device for separating a flowing medium mixture into at least two different fractions with differing average mass density, comprising an elongate separating space which is circle-symmetrical in axial direction and enclosed by a stationary casing (2), wherein the casing is provided with feeds for a mixture for separating and at least two discharges (9, 10) for discharging at least two fractions with differing mass density, and rotation means located in the separating space for causing the mixture to rotate as a vortex in the separating space. Also disclosed is a method for separating a flowing medium mixture.

18 Claims, 3 Drawing Sheets

DEVICE AND METHOD FOR SEPARATING A FLOWING MEDIUM MIXTURE WITH A STATIONARY CYCLONE

PRIORITY CLAIM

This patent application is a U.S. National Phase of International Patent Application No. PCT/NL2008/050012, filed Jan. 8, 2008, which claims priority to Netherlands Patent Application No. 2000429, filed Jan. 11, 2007, the disclosures of which are incorporated herein by reference in their entirety.

FIELD

The present disclosure relates to a stationary cyclone device for separating a flowing medium mixture into at least two different fractions with differing average mass density. The present disclosure also relates to a method for separating a flowing medium mixture into at least two fractions of differing mass density using a stationary cyclone.

BACKGROUND

The separation of a flowing medium mixture has very diverse applications. For purposes of the present disclosure, medium mixture means a mixture of at least one liquid or a gas which can be mixed with solid material parts, such as a powder or an aerosol. Examples are a gas/gas mixture, a gas/liquid mixture, a liquid/liquid mixture, a gas/solid mixture, a liquid/solid mixture, or any of the mixtures provided with one or more additional fractions. The separation of a flowing medium mixture is, for instance, known from various applications of liquid cleaning, (flue) gas cleaning and powder separation. Separation of fractions with a great difference in particle size and/or a great difference in mass density is relatively simple. Large-scale use is made of processes such as filtration and screening. In the separation of fractions with a smaller difference in mass density, chemical separating techniques and/or separating techniques such as sedimentation and centrifugation are used. A relatively simple and, therefore, inexpensive technology, with which large volumes can be separated in line, makes use of the differences in mass density of the fractions for separating by applying a centripetal force to the mixture by means of rotating the mixture in, for instance, a centrifuge or a cyclone. A relatively simple separating device comprising a stationary housing in which a vortex, i.e., a rotating mixture, can be generated is, for instance, described in International Patent Application Nos. 97/05956 and 97/28903. These devices are also referred to as “hydrocyclones” and are particularly suitable for liquid/liquid separation. It is noted that the fractions obtained after separation can still have (or be contaminated with) a part of the other fraction even after separation, although the fractions both have a composition clearly differing from the composition of the original mixture.

As a result of the rotation of the mixture in a stationary housing of the cyclone, a lighter fraction will at least substantially migrate to the inner side of the vortex and a heavier fraction will migrate to the outer side of the vortex. The heavier fraction and the lighter fraction are discharged at spaced-apart positions from the cyclone.

French Patent Application No. 2134520 describes a cyclone comprising a first feed part connecting radially to the separating space. The cyclone is also provided with a throughfeed part which allows passage of the mixture in a lateral direction and to which a guide with curved guide elements is connected, whereby a radial flow direction is obtained. Once the mixture has been set into rotating movement, the mixture is carried through a separator tube. Use of this construction will at best result in a mediocre separating result.

SUMMARY

The present disclosure describes several exemplary embodiments of the present invention.

One aspect of the present disclosure provides a device for separating a flowing medium mixture into at least two different fractions with differing average mass density, the device comprising a) a stationary casing defining an elongate separating space which is circle-symmetrical in an axial direction, the casing is provided with a feed for a mixture for separating and at least two discharges for discharging at least two fractions with differing mass density; and b) a mechanism for inducing rotation located in the separating space for causing the mixture to rotate as a vortex in the separating space; wherein the feed for a mixture for separating initially connects by means of a first feed part substantially radially to the separating space and transposes into a third feed part which forms the rotation means and debouches substantially tangentially in the separating space; wherein the device further comprises a plurality of first feed parts which connect to the separating space from different radial directions.

Another aspect of the present disclosure provides a method for separating a flowing medium mixture into at least two fractions with differing mass density, the method comprising the steps of a) feeding a mixture for separating to a stationary cyclone in a substantially radial direction; b) rotating the flowing mixture as a vortex in a stationary circle-symmetrical, elongate housing of the cyclone; and c) discharging at least two separated fractions from the stationary cyclone; wherein the mixture for separating is fed in different fractions from different radial directions to the stationary cyclone during step a.

A further aspect of the present disclosure provides a device for separating a flowing medium mixture into at least two different fractions with differing average mass density, the device comprising a) a stationary casing defining an elongate separating space which is circle-symmetrical in an axial direction; b) a mechanism for inducing rotation located in the separating space for causing the mixture to rotate as a vortex in the separating space; and c) a feeder assembly for a mixture for separating and at least two discharges for discharging at least two fractions with differing mass density, the feeder assembly comprising at least one first feed part oriented substantially radially to the separating space and transposes into a third feed part which forms the rotation mechanism and debouches substantially tangentially in the separating space.

The present disclosure provides an increase to the efficiency and/or the effectiveness of the separation of fractions of a flowing medium mixture using a vortex generated in a stationary housing.

The separating space usually has an elongate form having an inner side of circular cross-section (i.e., a cross-section perpendicularly of the longitudinal direction or lengthwise axis of the cyclone). The separating space can be provided with a core around which the mixture is set into rotation as a vortex. The device according to the present disclosure has a plurality of first feed parts which connect to the separating space from different radial directions, preferably such that the plurality of first feed parts connect at equal mutual angles to the periphery of the separating space. In other words, this means that the first feed parts connect at equal mutual distances to the periphery of the generally circular outer wall of the separating space. Advantageous results have been achieved in practice with twelve (12) first feed parts distributed evenly over the periphery. This provides for a uniform inflow of the mixture for separating such that a stable flow pattern occurs in the separating space sooner than if the device is only provided with one or a few first feed parts. A stable flow pattern has the advantage that the pre-separation already present in the mixture is sustained. The pre-separation resulting from the inflow will be further described below. In combination with the multiple feed, the obtained pre-separation will be maintained. Owing to the rotation means, the flow direction changes in axial direction of the device from axial to tangential (i.e., becomes greater in axial direction). These measures will, in combination, result in an unexpected increase in the separating capacity of the device. This is further enhanced when the first feed parts connect at mutually equal angles to the periphery of the separating space.

The separation thus takes place not only in the separating space, but the mixture for separating enters the separating space in an already pre-separated state (i.e., a state in which the mixture is no longer a homogenous mixture), i.e., in a state in which an already partial separation has taken place. This pre-separation is obtained during the feed of the mixture for separating by creating a transition from the initial radial feed direction to the final feed direction in which the mixture is fed to the separating space substantially tangentially of the inner wall of the separating space (i.e., parallel to the orientation of the inner wall at the position of the actual connection to the vortex) and by also maintaining this pre-separation of the mixture. As a result of the changing flow direction in the feed path, a heavier and a lighter fraction of the mixture for separating have different preferred flow directions. A heavier fraction has a greater preference for maintaining an existing flow direction than a lighter fraction. This is because heavier particles have a greater mass inertia and will, therefore, be less inclined to follow a change in the flow direction than lighter particles. A first degree of separation (pre-separation) is thus already obtained during feed. Now that measures are also taken so that this pre-separation is not lost on the subsequent inflow path into the separation space, it is possible using a vortex which remains constant to obtain an increased measure of separation or to suffice with a shorter retention time of, or a reduced pressure drop over, the mixture in the cyclone so as to obtain an identical degree of separation as with the prior art cyclones.

The device according to the present disclosure can be given a very compact form, among other reasons because of the multiple feed connecting to the separating space.

In one exemplary embodiment, the passage area of the separating space decreases in an axial direction. For purposes of the present disclosure, the passage area is the area of the separating space in a direction perpendicular to the axial direction. If the axial direction is defined as "Z", this means $dA/dZ<0$. For purposes of the present disclosure, the term "decreasing" means continuously decreasing, but that, although less desirable, $dA/dZ\leqq 0$ may also apply locally. The narrowing progression of the separating space is favourable for preventing, among other things, boundary layer separation. This measure also contributes to the further stabilization of the flow so that no deterioration in the already realized pre-separation occurs. This condition can, for instance, be met when the separating space is tapering. If the separating space is provided with an end pipe, it is advantageous that the end pipe is conical.

In another exemplary embodiment the third feed part comprises curved guide elements, while still further optimization can be realized if a curved stabilizing element is positioned between two adjacent curved guide elements of the third feed part. The difference between the curved guide elements and the curved stabilizing elements consists here of, among others, the difference in length between the two. It is also the case that the curved guide elements locally divide the feed into mutually separate compartments, while this does not have to be the case with the curved stabilizing elements. These are once again measures with which a stable flow pattern can be obtained. The outflow direction of the guide elements is substantially tangential to the inner wall of the separating space. The advantage of giving a stabilizing element a desirably shorter form is that it thus prevents flow blockage. As a result of these measures, the local Reynolds number will clearly decrease at different locations in the feed, whereby the chance of heavily turbulent flow in the feed (with a Reynolds number much greater than 2300 evidently being undesirable from a separating viewpoint) becomes considerably smaller, also at a higher flow rate.

The present invention makes it possible for the diameter of the separating space to be smaller than 75, 50, 25 or 10 mm. For purposes of the present disclosure, the diameter of the separating space is the internal diameter of the separating space. This dimensioning is important to the extent that it is possible to manufacture devices of limited size which can fit readily into all kinds of existing production processes and production equipment.

In another exemplary embodiment, a device is provided with an assembly of a plurality of feeds as described hereinabove combined into a single construction part. The feeds can be placed in a circle. A separate third tangential feed part, and optionally also a second axial feed part, can connect to each first radial feed part, although it is also possible for a plurality of first radial feed parts to connect to a shared third tangential feed part, and optionally also to a shared second axial feed part. The transition between successive feed parts, particularly, though not exclusively, the transition from a first radial feed part to the second axial feed part, can be formed by a channel having at least one curved guide surface. The advantage of the first feed part transposing into the third feed part by means of a curved guide is that this measure also contributes toward the uniform transition from the radial flow direction to another axial or directly tangential flow direction. This measure is also advantageous in respect to stabilizing the flow.

In order to also facilitate this transition in flow direction of the medium, the feed can also have between the first radial feed part and the third tangential feed part an intermediate second axial feed part running substantially parallel to the longitudinal axis of the separating space. By means of this measure, the number of changes in the flow direction (and/or the retention time for the purpose of pre-separation) increases during feed which results in an increased measure of pre-separation. This construction, moreover, enables simple integration of the feed with the separating space.

The present disclosure also provides a method for separating a flowing medium mixture into at least two fractions with differing mass density. The directions in which the different supplied fractions are fed to the stationary cyclone here preferably enclose mutually equal angles. The mixture for separating preferably has, between the initial radial flow directions and the final substantially tangential flow direction, a flow direction which is substantially parallel to the longitudinal axis of the cyclone (in axial direction).

It is desirable for the purpose of obtaining an optimum pre-separation that the medium mixture has a substantially laminar flow pattern during processing step a. A substantially laminar flow pattern here also includes the transition zone in which the laminar flow pattern transposes into a heavily turbulent flow pattern (with a typical Reynolds number in the order of a magnitude of several thousand), more particularly a flow pattern wherein the Reynolds number is smaller than 2300, preferably smaller than 2000, but still more desirably less than, respectively, 1500, 1200 or 1000. By means of this method, the advantages can be realized as already described hereinabove with reference to the device according to the present disclosure.

In order to obtain an even better separation result, it can also be advantageous if the medium mixture instantaneously expands during the feed over the feed openings, for instance, expands such that microbubbles are created. This principle works if the medium mixture is supersaturated upon entry into the cyclone. The microbubbles that are present adhere to the lighter fraction, whereby the effective difference in mass density of the fractions for separating increases.

BRIEF DESCRIPTION OF THE DRAWINGS

Various aspects of the present disclosure are described hereinbelow with reference to the accompanying figures.

DETAILED DESCRIPTION

Figure 1:
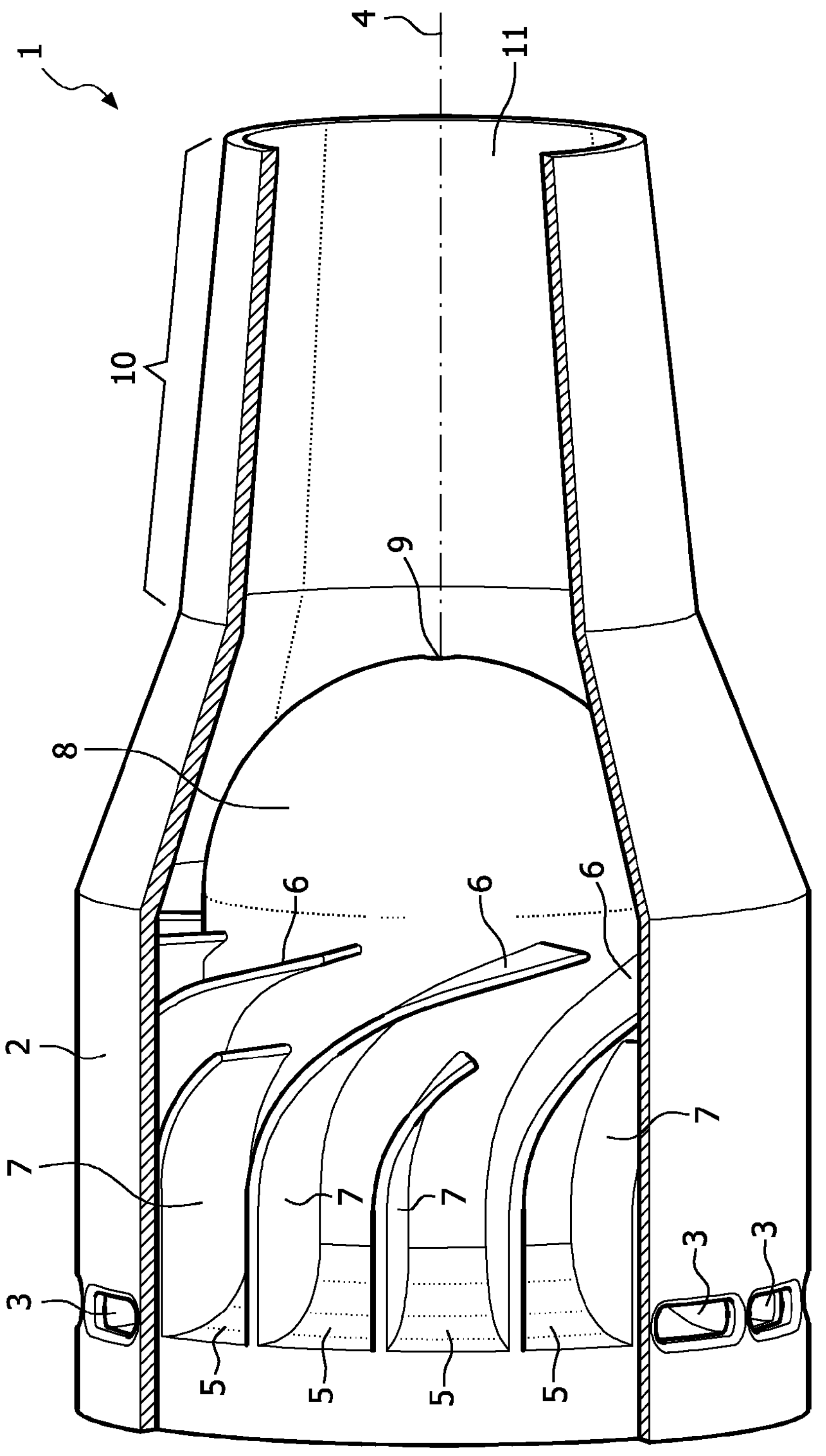
FIG. 1 shows a perspective and partial cut-away view of one exemplary embodiment of a separating device according to the present disclosure.

FIG. 1 shows a separating device 1, also referred to as a static cyclone or hydrocyclone, with a casing 2 in which a number of feed openings 3 are arranged for a medium mixture to be processed. Casing 2 of separating device 1 encloses a separating space having a central axis (or longitudinal axis) 4 relative to which the feed openings 3 are positioned radially. The medium mixture supplied radially through feed openings 3 is urged axially substantially in a direction parallel to central axis 4 by curved guide surfaces 5 connecting to feed openings 3. Disposed downstream of these guide surfaces 5 in the flow direction are curved guide elements 6 which direct the medium mixture in a more tangential direction relative to casing 2. Shorter stabilizers 7 are placed between guide elements 6, as a result of which a substantially more laminar flow can be maintained, even at higher flow speeds, between guide elements 6 and stabilizers 7.

A core 8 is provided centrally in casing 2. Guide elements 6 and stabilizers 7 connect to both the inner side of casing 2 and core 8 so that all of the medium is carried in forced manner between guide elements 6. Guide elements 6 are formed such that the guide elements have a sharper curvature at a greater distance from feed openings 3. A discharge opening 9 for the lighter fraction of the mixture is arranged centrally in core 8. Through rotation of the mixture, particularly in the narrowed part 10 of separating device 1, the lighter fraction will be displaced to a position close to central axis 4, whereby the lighter fraction can be removed from separating device 1 through discharge opening 9 in core 8. The heavier fraction of the mixture will migrate in the narrowed part 10 of separating device 1 toward casing 2 and will subsequently be discharged from separating device 1 through outlet opening 11. The length 10 can, in reality, be much greater than the scale with which it is shown in FIG. 1. It is also desirable that $dA/dZ<0$ or that $dA/dZ\leqq 0$ in the area where core 8 is situated.

Figure 2B:
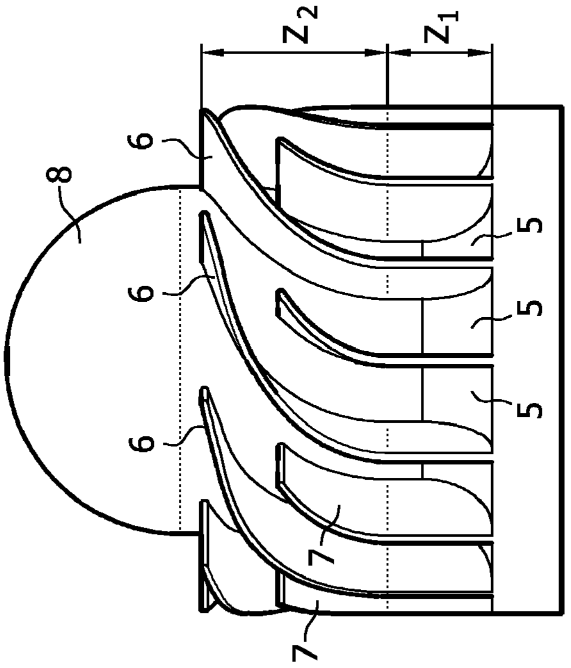
FIG. 2B shows a side view of a feed element forming part of the separating device shown in FIG. 1 integrated with the core of a cyclone.
Figure 2A:
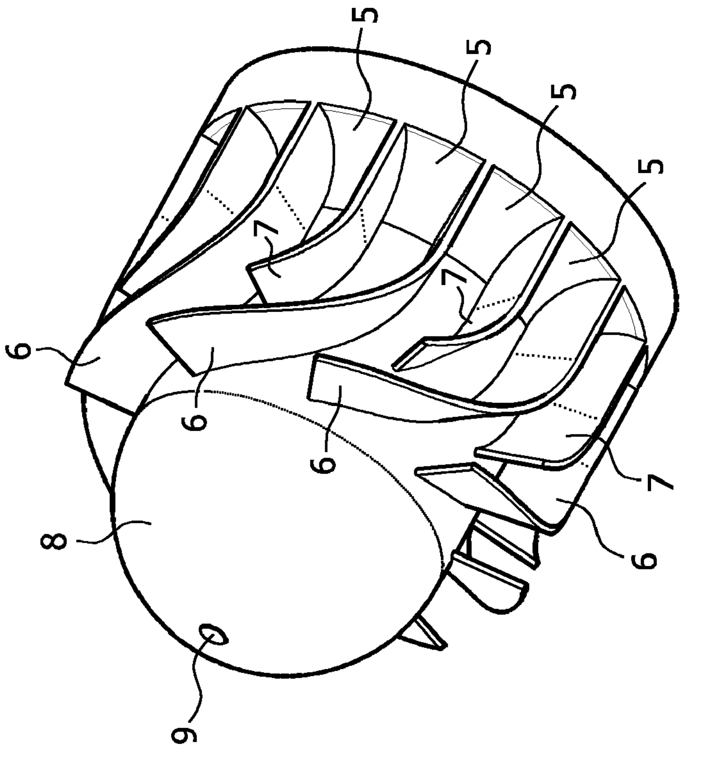
FIG. 2A shows a perspective view of a feed element forming part of the separating device shown in FIG. 1 integrated with the core of a cyclone.

FIGS. 2A and 2B show views of core 8 of FIG. 1 having assembled integrally therewith the guide surfaces 5, guide elements 6 and stabilizers 7. Stabilizers 7 do not necessarily have to be present. Separation device 1 will also be able to function without these stabilizers 7. The transition from a radial flow direction to an axially oriented flow takes place in a first zone $Z_1$ (see FIG. 2B), while the axially oriented flow is converted to a substantially tangential flow direction in the second zone $Z_2$ (see FIG. 2B).

Figure 3:
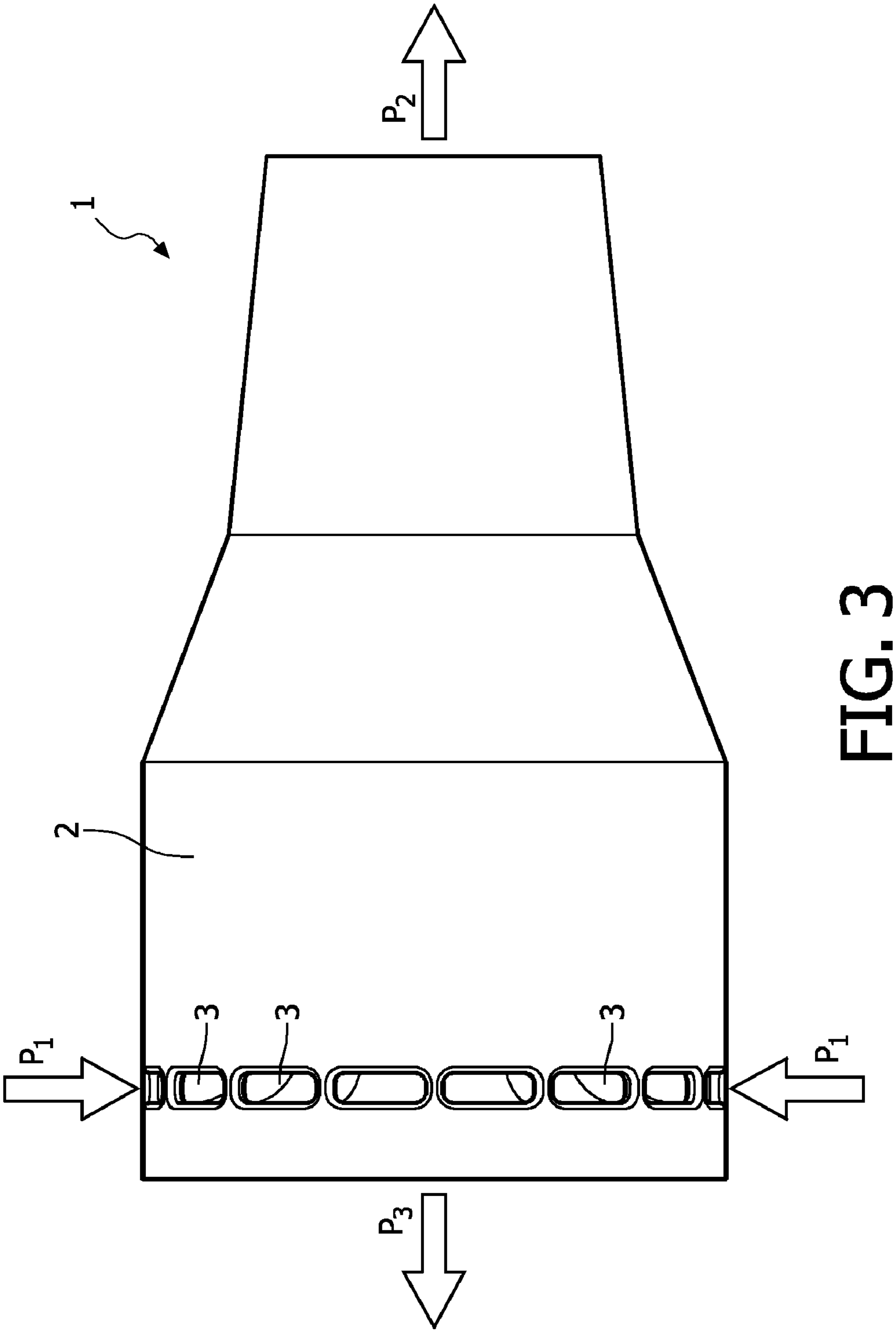
FIG. 3 is a side view of the outer side of the separating device shown in FIG. 1.

FIG. 3 shows separating device 1 to which a medium mixture for separating is fed through feed openings 3 as shown by arrows $P_1$. A heavier fraction will leave separating device 1 on a proximal side as shown by arrow $P_2$, while the lighter fraction will leave separating device 1 on the distal side as shown by arrow $P_3$. The shown separating device 1 is particularly suitable for application as an oil/water separator. It will, however, be apparent that other applications, a different dimensioning and alternative exemplary embodiment also fall within the scope of protection of the present disclosure.

All patents, patent applications and publications referred to herein are incorporated by reference in their entirety.

The invention claimed is:

1. A cyclone device for separating a flowing medium mixture into at least two different fractions with differing average mass density, the cyclone device comprising:

a) a stationary housing defining an elongate separating space which is circle-symmetrical in an axial direction, the housing further including a plurality of feed inlet openings adapted to receive being provided with a feed for a mixture for separating and at least two discharges areas for discharging at least two fractions with differing mass density, of which the discharge area for the heavy fraction is connecting centrally to the elongate separating space; and b) a mechanism for inducing rotation located in the separating space for causing the mixture to rotate as a vortex in the separating space, wherein the feed for a mixture for separating initially is connected by means of a plurality of first feed parts to the separating space and is associated with a plurality of guide elements which forms the rotation inducing mechanism and debouches substantially tangentially in the separating space, wherein each first feed part connects substantially radially to the stationary housing proximate to a feed opening in the stationary housing and thereby connect to the separating space from a unique radial direction.

2. The cyclone device of claim 1, wherein the number of feed openings forming the plurality of first feed parts connect at equal mutual angles to the periphery of the stationary housing of the elongate separating space.

3. The cyclone device of claim 1, wherein the discharge for the heavy fraction is connected centrally to the housing defining the separating space which tapers along the axial direction.

4. The cyclone device of claim 1, further comprising a curved stabilizing element interposed between two adjacent guide elements.

5. The cyclone device of claim 1, wherein the diameter of the separating space is less than 75 mm.

6. The cyclone device of claim 1, wherein each guide element comprises a straight portion running substantially parallel to the longitudinal axis of the separating space.

7. The cyclone device of claim 1, wherein each guide element comprises a curved portion.

8. A method for separating a flowing medium mixture into at least two fractions with differing mass density, the method comprising the steps of:

a) feeding a mixture for separating to a stationary cyclone device according to claim 1 in a substantially radial direction;

b) rotating the flowing mixture as a vortex in a stationary circle-symmetrical, elongate housing of the cyclone; and c) discharging at least two separated fractions from the housing of the stationary cyclone whereby the heavy fraction is discharged centrally from the housing of the cyclone;

wherein the mixture for separating is fed in different fractions from different radial directions to the stationary cyclone during step a) via a plurality of first feed parts that are arranged as a number of feed openings in the stationary housing.

9. The method of claim 8, wherein the directions in which the different supplied fractions via a plurality of first feed parts are fed to the stationary cyclone enclose mutually equal angles.

10. The method of claim 8, wherein between the initial, substantially radial flow directions and the final substantially tangential flow direction the mixture for separating has an intermediate flow direction during step a which is substantially axial to the vortex.

11. The method of claim 8, wherein the flow of the medium mixture to be fed to the cyclone has a substantially laminar flow pattern during step a.

12. The method of claim 8, wherein the medium mixture instantaneously expands during the feed to the vortex.

13. The cyclone device of claim 1, wherein the guide elements connect to the feed openings in the stationary housing.

14. A device for separating a flowing medium mixture into at least two different fractions with differing average mass density, the device comprising:

a) a stationary casing having an axis and defining an elongate separating space having a circular cross-sectional shape;

b) a rotatable core associated with the casing;

c) a plurality of feed inlet openings defined in the casing;

d) a first discharge opening defined in the casing;

e) a second discharge opening defined in the casing;

f) a curved guide surface associated with the casing and the core;

g) a plurality of rotation guide elements, each rotation guide element comprising i. a proximal generally flat first section extending from the guide surface in a direction generally parallel to the casing axis, wherein at least one feed inlet opening is sized and spaced to be disposed between adjacent first rotation guide element first sections and ii. a distal curved second section; and, h) a plurality of stabilizers, each stabilizer having i. a proximal generally flat section extending from the guide surface in a direction generally parallel to the casing axis and ii. a distal section.

15. The device of claim 14, wherein each stabilizer is disposed between adjacent rotation guide elements.

16. The device of claim 14, wherein each stabilizer is shorter in length than each rotation guide element.

17. The device of claim 14, wherein the first discharge opening is defined in an axial direction in the core and through which a lighter fraction of separated flowing medium can pass.

18. The device of claim 14, wherein the second discharge opening is defined in the casing and through which a heavier fraction of separated flowing medium can pass.

* * * * *